United States Patent
Gall et al.

[11] 3,910,943
[45] *Oct. 7, 1975

[54] 2-[3,5-DISUBSTITUTED-4H-1,2,4-TRIAZOL-4-YL]BENZHYDROL

[75] Inventors: Martin Gall, Kalamazoo; Jackson B. Hester, Jr., Galesburg, both of Mich.

[73] Assignee: The Upjohn Company, Kalamazoo, Mich.

[*] Notice: The portion of the term of this patent subsequent to May 28, 1991, has been disclaimed.

[22] Filed: Oct. 29, 1973

[21] Appl. No.: 410,781

Related U.S. Application Data

[63] Continuation-in-part of Ser. No. 172,919, Aug. 18, 1971, Pat. No. 3,813,412.

[52] U.S. Cl. ......... 260/308 R; 71/92; 260/247.1 E; 260/247.5 E; 260/268 MK; 260/293.69; 424/248; 424/267; 424/269
[51] Int. Cl.² ............ C07D 249/08; C07D 401/06; C07D 403/06; C07D 413/06
[58] Field of Search ..... 260/308 R, 247.5 E, 293.69

[56] References Cited
UNITED STATES PATENTS
3,813,412  5/1974  Gall et al. ................... 260/308 R

*Primary Examiner*—Alton D. Rollins
*Attorney, Agent, or Firm*—Hans L. Berneis

[57] ABSTRACT
Compounds of the formula VI

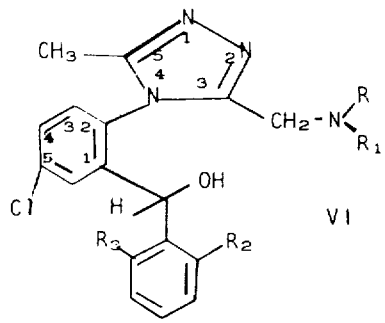

wherein R and $R_1$ are hydrogen, methyl or ethyl, or together

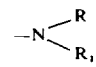

is piperidino pyrrolidino or morpholino; wherein $R_2$ is hydrogen, chlorine or fluorine; and wherein $R_3$ is hydrogen or fluorine, are prepared by reducing a 2-(3,5-disubstituted-4H-1,2,4-triazol-4-yl) benzophenone to obtain the corresponding 2-(3,5-disubstituted-4H-1,2,4-triazol-4-yl)benzhydrol or by reducing with borane a 4-(2-benzoylphenyl)-5-Substituted-4H-1,2,4-triazole-3-carboxaldehyde 3-(O-acyloxime) [obtained by acylating the corresponding oxime to give the corresponding 2-[3-(aminomethyl)-5-substituted-4H-1,2,4-triazol-4-yl]benzhydrol.

The novel compounds of formula VI and the pharmacologically acceptable acid addition salts thereof are active sedatives.

4 Claims, No Drawings

2-[3,5-DISUBSTITUTED-4H-1,2,4-TRIAZOL-4-YL]BENZHYDROL

CROSS REFERENCE TO RELATED APPLICATIONS

This application is a continuation-in-part of application Ser. No. 172,919, filed Aug. 18, 1971, now U.S. Pat. No. 3,813,412.

BRIEF SUMMARY OF THE INVENTION

FIELD OF THE INVENTION

This invention is directed to novel organic compounds and is more particularly concerned with benzhydroles useful as tranquilizers, sedatives, and hypnotics or as intermediates for other tranquilizers, sedatives, hypnotics, muscle relaxants, anticonvulsants, or feed additives, and a process therefore.

This new process and the novel intermediates are illustratively represented in Schemes A and B as follows:

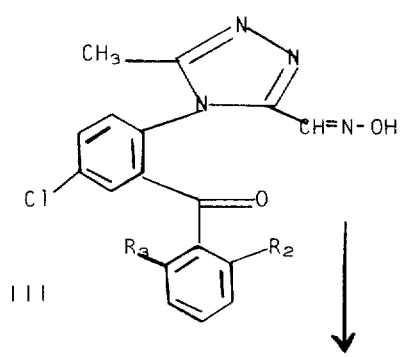

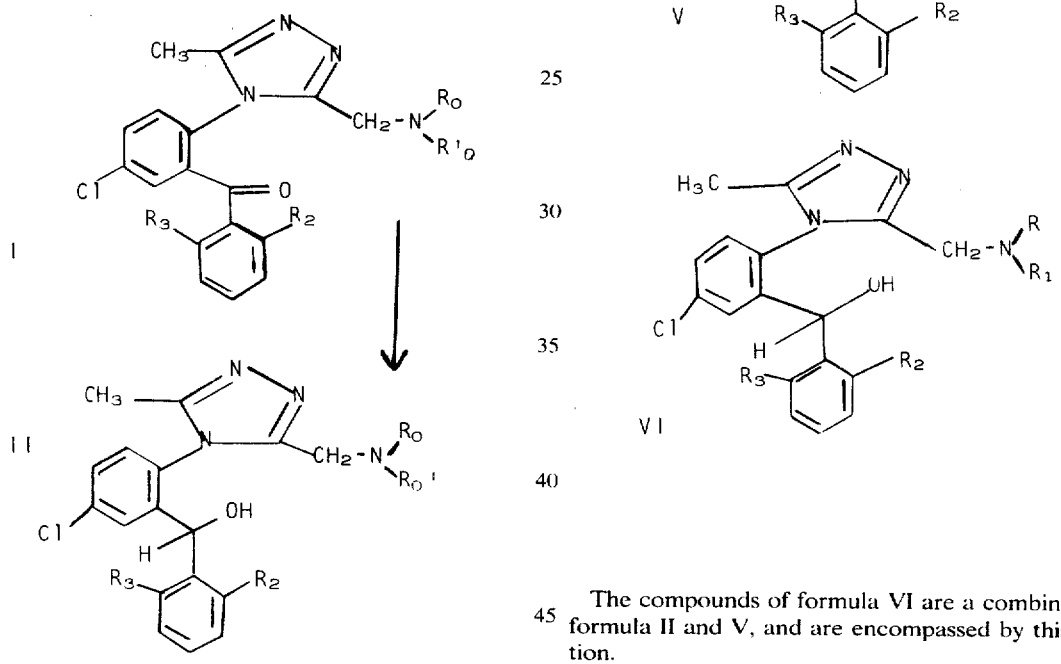

The compounds of formula VI are a combination of formula II and V, and are encompassed by this invention.

In the above formula (I through VI), $R_o$ and $R_o'$ are methyl, ethyl, or

is piperidino, pyrrolidino or morpholino; R and $R_1$ are hydrogen, methyl or ethyl, or together

is piperidino, pyrrolidino, or morpholino; $R_2$ is hydrogen, fluorine or chlorine; and $R_3$ is hydrogen or fluorine.

The most desirable products of this invention have the formula VII

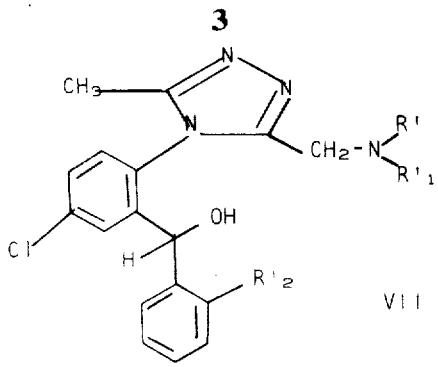

wherein R' and R'₁ is hydrogen or methyl, or together

is pyrrolidino; wherein R'₂ is hydrogen or chlorine and the pharmacologically acceptable acid addition salts thereof. The pharmacologically acceptable acid addition salts of the compounds of formula VI are also encompassed by this invention.

The process of Method A comprises reducing a compound of formula I wherein $R_o$, $R'_o$, $R_2$, and $R_3$ are defined as hereinabove, with an alkali metal borohydride, e.g. sodium or potassium borohydride or lithium tri-(tert.butoxy) aluminum hydride.

The process of Method B comprises acylating a compound of structure III to produce IV with an acid anhydride of an alkanoic acid of 2 to 3 carbon atoms, inclusive, followed by a simultaneous reduction of the carbonyl group and the oxime O-ester of IV with borane to give the compound of formula V. Pharmacologically acceptable acid addition salts are produced by reacting compounds of formula VI (II or V) with an excess of the selected acid.

DESCRIPTION OF THE PREFERRED EMBODIMENT

The compounds of formula VI have sedative, tranquilizing, and hypnotic effects.

Sedative effects of 5-chloro-2-[3-aminomethyl)-5-methyl-4H-1,2,4-triazol-4-yl]benzhydrol are shown by the following tests in mice:

Chimney test: [Med. Exp. 4, 145 (1962)]: The effective intraperitoneal dosage for 50% of mice ($ED_{50}$) is 4.5 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. The mice remaining in the dish for more than 3 minutes indicates tranquilization. The $ED_{50}$ equals the dose of the test compound at which 50% of the mice remain in the dish. The $ED_{50}$ (intraperitoneal administration) in this test was 2.8 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 6 mg./kg.

Nicotine antagonism test: Mice in a group of 6 are injected with the test compound 2-[3-(aminomethyl)-5-methyl-4H-1,2,4-triazol-4-yl]benzhydrol. Thirty minutes later the mice including control (untreated) mice, are injected with nicotine salicylate (2 mg./kg.). The control mice show overstimulation, i.e., (1) running convulsions followed by (2) tonic extensor fits; followed by (3) death. An intraperitoneal dosage of 1.6 mg./kg. of the test compound protected 50% of the mice against (2) and (3) ($ED_{50}$).

The following compounds have (by intraperitoneal injection) $ED_{50}$ values as shown in the table below:

| COMPOUND | $ED_{50}$ (in mg./kg.) | | | |
|---|---|---|---|---|
| | CH | D | P | Ni |
| 2-[5-methyl-3-(pyrrolidinomethyl)-4H-1,2,4-triazol-4-yl]benzhydrol (A) | 28 | 3.5 | 5.0 | 2.5 |
| 2-[5-methyl-3-(pyrrolidinomethyl)-4H-1,2,4-triazol-4-yl]benzhydrol (B) | 11 | 14 | 16 | 14.0 |

Ch = Chimney test
D = dish test
P = pedestal test
Ni = nicotine antagonism (3) test The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers, or for coating purposes. Oil, e.g., coconut oil, sesame oil, safflower oil, cottonseed oil, peanut oil, may be used for preparing solutions or suspensions of the active drug. Sweetening, coloring, and flavoring agents may be added.

For mammals and birds food premixes, with starch, oatmeal, dried fishmeat, fishmeal, flour and the like can be prepared.

As tranquilizers the compounds of formula VI can be used in dosages of 0.5–20 mg./kg. in oral or injectable preparations as described above, to alleviate tension and anxiety in mammals, or birds, such as e.g., occur when animals are in travel.

The pharmacologically acceptable acid addition salts of compounds of formula VI contemplated in this invention, are the hydrochlorides, hydrobromides, hydroiodides, sulfates, phosphates, cyclohexanesulfamates, methanesulfonates, and the like, prepared by reacting a compound of formula VI with the selected pharmacologically acceptable acid.

As feed additives the compounds of formula VI can be used in dosages of 0.3 mg. to 50 g. per ton of feed to increase growth, feed consumption, and feed efficienty in livestock and poultry, milk production in the mammalian species and egg production in the avian species.

Other acid addition salts of the compounds of formula IV can be made such as the fluosilicic acid addition salts which are useful mothproofing compounds, or the trichloroacetates useful as herbicides against Johnson grass, Bermuda grass, yellow foxtail and green foxtail, and quack grass.

The starting materials, compounds of formula I, are produced as shown in the preparations and as earlier disclosed in application Ser. No. 114,049, filed Feb. 9, 1971, by Jackson B. Hester, Jr., now U.S. Pat. No. 3,709,898. The starting compounds of formula III are also disclosed in the preparations and in the above cited patent application.

In carrying out the process of this invention by MEthod A a selected 2-[3-substituted 4H-1,2,4-triazo]-4-yl]benzophenone (1) is treated with a reducing agent, e.g. an alkali borohydride such as sodium or potassium borohydride or lithium tri-(tert.-butoxy) aluminum hydride in an organic solvent. As solvents, lower-alkanols (with the borohydrides only) and ethers e.g. methanol, ethanol, 1- and 2-propanol, ethyl ether, dibutyl ether tetrahydrofuran and the like can be used. In the preferred embodiment of this invention, compound 1 is stirred between 6 to 36 hours with the reductant in the selected solvent, in a nitrogen atmosphere, at first at low temperature between −5° and 10° C. till all the solid is added, then at room temperature (22°–25° C.). However, temperatures up to 50° C. are operative. At the termination of the reaction, the products (II) are recovered and purified by conventional means such as extraction, chromatography, crystallization and the like. Two different diastereomers are generally isolated by chromatography.

In Method B a selected 4-(2-benzoylphenyl)-4H-1,2,4-triazole-3-carboxaldehyde 3-oxime III is acylated with a lower alkanoic acid anhydride in a conventional manner e.g. with acetic or propionic anhydride, preferably in an organic solvent, e.g., pyridine, benzene, or tetrahydrofuran, in a nitrogen atmosphere, at temperatures between 0°–40° C. The product IV, an O-acyloxime, is recovered and purified by convenional procedures: pouring the reaction mixture into water and recovering a crude product by filtration or extraction, which can be purified by crystallization.

Compound IV is converted to the corresponding 2-[3-(aminomethyl)-4H-1,2,4-triazol-4-yl)]benzhydrol (V) by treating IV with a solution of borane ($BH_3$) in a solvent e.g. ether, tetrahydrofuran, methanol, ethanol, and the like. In the preferred embodiment of this invention, the borane is used in excess, in a nitrogen atmosphere, with tetrahydrofuran as solvent during 2–36 hours. The reaction is carried out at first at low temperatures for 1–4 hours and then continued for the remainder of time at between 20°–40° C. generally at room temperatures, 22°–26° C. At the termination of the reaction the reaction mixture is treated under cooling with hydrochloric acid and the product recovered and purified by conventional means, e.g. filtrations, extractions, chromatography, crystallization, and the like.

The following examples are illustrative of the processes and products of the present invention, but are not to be construed as limiting.

PREPARATION 1

2′-Benzoly-4′-chloroacetanilide

Acetyl chloride (81.3 g., 1.037 mole) was added to a stirred solution of 2-amino-5-chlorobenzophenone (200.0 g., 0.864 mole) and pyridine (68.4 g., 0.864 mole) in ether (4.1); the mixture was kept at ambient temperatures for 2 hours and treated with 500 ml. of water. The layers were separated and the ether layer was dried over anhydrous sodium sulfate and concentrated. Crystallization of the residue from ethyl acetate-Skellysolve B hexanes gave: 124.0 g. of 2′-benzoyl-4′-chloroacetanilide of melting point 114°–115° C. Two more crops of 2′-benzoyl-4′-chloroacetanilide also were obtained: 67.8 g. of melting point 113.5°–114.5° C. and 33.0 g. of melting point 113°–114° C.

PREPARATION 2

6-Chloro-4-phenyl-2(1H)-quinolone

The procedure (reaction of 2′-benzoyl-4′-chloroacetanilide with sodium hydroxide) of A. E. Drukker and C. I. Judd, J., Heterocyclic Chem. 3, 359 (2966) was used for this preparation. The yield was 77 percent. Two other preparations have been described: S. C. Bell, T. S. Sulkowski, C. Gochman and S. J. Childress, J. Org. Chem. 27,562 (1962); G. A. Reynolds and C. R. Hauser, J. Amer. Chem. Soc. 72, 1852 (1950).

PREPARATION 3

2,6-Dichloro-4-phenylquinoline

The procedure of A. E. Drukker and C. I. Judd, J. Heterocyclic Chem. 3,359 (1966) was used for this preparation. The yield was 62 percent.

PREPARATION 4

6-Chloro-2-hydrazino-4-phenylquinoline

A stirred mixture of 2,6-dichloro-4-phenylquinoline (2.7 g., 0.01 mole) and hydrazine hydrate (6.8 g.) was refluxed under nitrogen for 1 hour and concentrated in vacuo. The residue was suspended in warm water, and the solid was collected by filtration, dried and recrystallized from ethyl acetate-Skelly B hexanes to give 1.81 g. (67% yield) of 6-chloro-2-hydrazino-4-phenylquinoline of melting point 156.5°–157° C.

Anal. Calcd. for $C_{15}H_{12}ClN_3$: C, 66.79; H, 4.49; Cl, 13.15; N, 15.58. Found: C, 67.15; H, 4.65; Cl, 13.19; N, 15.32.

PREPARATION 5

7-Chloro-1-methyl-5-phenyl-s-triazolo-[4,3-a]quinoline

A stirred mixture of 6-chloro-1-hydrazino-4-phenylquinoline (1.4 g., 0.0052 mole), triethyl orthoacetate (0.925 g., 0.0057 mole) and xylene (100 ml.) was refluxed, under nitrogen, for 2 hours 40 minutes. During this period the ethanol formed in the reaction was removed by distillation through a short, glass helix-packed column. The mixture was concentrated to dryness in vacuo and the residue was crystallized from methanol-ethyl acetate to give: 1.02 g. of 7-chloro-1-methyl-5-phenyl-s-triazolo-[4,3-a]quinoline of melting point 253.5°–255° C. and 0.26 g. of melting point 253.5°–255° C. (83.9 percent yield). The analytical sample was crystallized from methylene chloride:methanol and had a melting point 252.5°–253.5° C.

Anal. calcd. for $C_{17}H_{12}ClN_3$: C, 69.50; H, 4.12, Cl, 12.07; N, 14.31. Found: C, 69.39; H, 4.02; Cl, 12.10, N, 14.49.

PREPARATION 6

5-Chloro-2-(3-methyl-4H-1,2,4-triazol-4-yl)benzophenone (Oxidation of 7-chloro-1-methyl-5-phenyl-s-triazolo[4,3-a]quinoline)

A stirred suspension of 7-chloro-1-methyl-5-phenyl-s-triazolo[4,3-a]quinoline (2.94 g., 0.01 mole) in acetone (110 ml.) was cooled in an ice-bath and treated slowly with a solution prepared by adding sodium periodate (2 g.) to a stirred suspension of ruthenium dioxide (200 mg.) in water (35 ml.). The mixture became dark. Additional sodium periodate (8 g.) was added during the next 15 minutes. The ice bath was removed and the mixture was stirred for 45 minutes. Additional sodium periodate (4 g.) was added and the mixture was stirred at ambient temperature for 18 hours and filtered. The solid was washed with acetone and the combined filtrate was concentrated in vacuo. The residue was suspended in water and extracted with methylene chloride. The extract was dried over anhydrous potassium carbonate and concentrated. The residue was chromatographed on silica gel (100 g.) with 10% of methanol-90% ethyl acetate; 50 ml. fractions were collected. The product was eluted in fractions 10–20 and was crystallized from ethyl acetate to give: 0.405 g. of melting point 168°–169.5° C. and 0.291 g. of melting point 167.5°–169° (23.4% yield) of 5-chloro-2-(3-methyl-4H-1,2,4-triazol-4-yl)benzophenone. The analytical sample had a melting point of 168° C.

Anal. calcd. for $C_{16}H_{12}ClN_3O$: C, 64.54; H, 4.06; Cl, 11.91; N, 14.11. Found: C, 64.56; H, 4.35; Cl, 11.97; 11.93; N, 14.29

PREPARATION 7

Oxidation of 7-chloro-1-methyl-5-phenyl-s-triazolo[4,3-a]quinoline

A stirred suspension of 7-chloro-1-methyl-5-phenyl-s-triazolo[4,3-a]quinoline (2.94 g., 0.01 mole) and acetone (200 ml.) was cooled in an ice bath and treated, dropwise, during 15 minutes with a solution prepared from ruthenium dioxide (200 mg.), sodium periodate (4g.), and water (35 ml.). A slight exothermic reaction was noted and the mixture became dark. After 10 minutes, 29 ml. of a solution of sodium periodate (12 g.) in water (70 ml.) was added during 10 minutes. This mixture was stirred for 2 hours and then the remaining sodium periodate solution (41 ml.) was added during the next 3 hours. The mixture was concentrated in vacuo to remove acetone. The resulting aqueous mixture was extracted with methylene chloride. The extract was washed with water, dried over anhydrous magnesium sulfate, and concentrated. The residue was chromatographed on silica gel (150 g.) with 2% methanol-98% chloroform; 60 ml. fractions were collected. Recovered starting material was eluted in fractions 11–14 and crystallized from methanol-methylene chloride to give 0.069 g. of melting point 251.5°–253.5° C. A mixture of the two products was eluted in fractions 15–39. Crystallization of this mixture from ethyl acetate gave 618 mg. (20.8%) of 5-chloro-2-(3-methyl-4H-1,2,4-triazol-4-yl)benzophenone of melting point 165.5°–168°. Crystallization of the mother liquor from methanol gave 0.126 g., melting point 108°–112° and 0.588 g. of melting point 101.5°–105.5° (decomposition) 19.9 percent yield) of a methanol solvate of 4-(2-benzoyl-4-chlorophenyl)-5-methyl-4H-1,2,4-triazole-3-carboxaldehyde. The analytical sample had a melting point 100°–101.5° C.

Anal. calcd. for $C_{17}H_{12}ClN_3O_2$: C, 62.68; H, 3.71; Cl, 10.89; N, 12.90. Found: C, 59.37; H, 4.89; Cl, 9.75; N, 11.30.

MeOH 9.34%; $H_2O$, 0.40%. Corrected for MeOH and $H_2O$: C, 61.90; H, 4.06; Cl, 10.80; N, 12.52.

Heating the solvate in a desiccator at 70° C at 15 mm. Hg for 72 hours gave pure 4-(2-benzoyl-4-chlorophenyl)-5-methyl-4H-1,2,4-triazole-3-carboxaldehyde.

PREPARATION 8

Oxidation of 7-chloro-1-methyl-5-phenyl-s-triazolo[4,3-a]quinoline

A vigorous stream of ozone in oxygen was bubbled for 12 hours, into a stirred, ice-cold solution of 7-chloro-1-methyl-5-phenyl-s-triazolo[4,3-a]quinoline (31.1 g., 0.106 mole) in methanol (750 ml.) and methylene chloride (500 ml.). The resulting mixture was filtered and the filtrate was added to an ice-cold solution of sodium iodide (47.5 g.) and acetic acid (63 ml.) in water (200 ml.). The solution was decolorized by the addition of sodium thiosulfate and concentratd in vacuo. The residue was mixed with water and extracted with methylene chloride. The extract was washed ($H_2O$), dried over anhydrous magnesium sulfate and concentrated. The residue was chromatographed on silica gel (1.5 kg.); 175 ml. fractions were collected. Fractions 1–128 were eluted with 1% methanol-99% chloroform and fractions 129–168 with 5% methanol-95% chloroform. The first compound was eluted in fractions 49–60 and crystallized from methanol-ethyl acetate to give: 0.769 g. of melting point 229.5° –231°C. (decomposition) and 0.535 g. of melting point 228°C. (decomposition) of 7-chloro-1-methyl-5-phenyl-s-triazolo[4,3-a]quinolin-4(5H)-one. The analytical sample had a melting point 232°–233° C.

Anal. calcd. for $C_{17}H_{12}ClN_3O$: C, 65.92; H, 3.91; Cl, 11.44; N, 13.57 Found: C, 65.46; H, 3.72; Cl, 11.48; N, 13.59

Recovered starting material was eluted in fractions 66–78 and crystallized from methylene chloride-methanol to give 0.737 g. of melting point 251°–253.5° C. A mixture of the two remaining products was eluted in fractions 73–168. Crystallization of this mixture from ethyl acetate gave: 10.8 g. of melting point 116.5°–167.5° C., 0.987 g. of melting point 116°–167° C. and 2.52 g. of melting point 164°–165.5° C. (45.3 percent yield) of 5-chloro-2-(3-methyl-4H-1,2,4-triazol-4-yl)benzophenone. Crystallization of the mother liquor from methanol gave 5.62 g. of melting point 140°–141.5° C., 1.23 g. of melting point 100.5°–102.5° (decomposition) and 1.04 g. of melting point 105°–137.5° (20.8 percent yield) of 4-(2-benzoyl-4-chloro-phenyl)-5-methyl-4H-1,2,4-triazole-3-carboxaldehyde.

PREPARATION 9

5-chloro-2-(3-methyl-4H-1,2,4-triazol-4-yl)-benzophenone

A stirred solution of silver nitrate (0.357 g., 0.0021 mole) in water (1.8 ml.) was treated with 1N sodium hydroxide (4.1 ml.). To the resulting stirred suspension of silver oxide was added a warm solution of 4-(2-benzoyl-4-chlorophenyl)-5-methyl-4H-1,2,4-triazole- 3-carboxaldehyde methanol solvate (326 mg.) in methanol (15 ml.), and the resulting mixture was stirred under nitrogen at ambient temperature for 18 hours. The solid was collected by filtration and washed with water and methanol. The filtrate was concentrated in vacuo to remove methanol and the resulting aqueous solution was cooled in an ice bath, neutralized with hydrochloric acid and extracted with chloroform. The residue was crystallized from ethyl acetate to give 0.162 g. of 5-chloro-2-(3-methyl-4H-1,2,4-triazol-4-yl)-benzophenone of melting point 169.5°–171° C.

PREPARATION 10

4-(2-Benzoyl-4-chlorophenyl)-5-methyl-4H-1,2,4-triazole-3-carboxaldehyde 3-oxime A stirred mixture of 4-(2-benzoyl-4-chlorophenyl)-5-methyl-4H-1,2,4-triazole-3-carboxaldehyde (3.26 g.), hydroxylamine hydrochloride (0.765 g., 0.011 mole), sodium acetate (0.903 g., 0.011 mole), ethanol (50 ml.) and water (12.5 ml.) was refluxed, under nitrogen for 4.5 hours. (The product precipitated from the initially clear solution during the reflux period.) The cooled mixture was poured into cold water, and the solid was collected by filtration, washed with water and dried to give 2.7 g. of crude 4- (2-benzoyl-4-chlorophenyl)-5-methyl-4H-1,2,4-triazole-3-carboxaldehyde-3-oxime. Crystallization of this material from methylene chloridemethanol gave: 2.03 g., of melting point 280°–281° C. (decomposition); 0.325 g. of melting point 278.5°–279.5° C. (decomposition) and 0.154 g. of melting point 276°–277° C. (decomposition) of 4-(2-benzoyl-4-chlorophenyl)-5-methyl-4H-1,2,4-triazol-3-carboxaldehyde 3-oxime. The analytical sample had a melting point of 283.5°–284° C. (decomposition).

Anal. Calcd. for $C_{17}H_{13}ClN_4O_2$: C, 59.92; H, 3.84; Cl, 10.41; N, 16.44. Found: C, 60.20 H, 4.22; Cl, 9.92; N, 16.78.

PREPARATION 11

6-chloro-4-(2,6-difluorophenyl)-2-hydrazinoquinoline

In the manner given in Preparation 4, 2,6-dichloro-4-(2,6-difluorophenyl)quinoline (prepared as in Preparations 1 to 3) was reacted at reflux with hydrazine hydrate to give 6-chloro-4- (2,6-difluorophenyl)-2-hydrazinoquinoline.

PREPARATION 12

7-chloro-1-methyl-5-(2,6-difluorophenyl)-s-triazolo[4,3-a]quinoline

In the manner given in Preparation 5, 6-chloro-4-(2,6-difluorophenyl)-2-hydrazinoquinoline and triethyl orthoacetate are refluxed in xylene to give 7-chloro-1-methyl-5-(2,6-difluorophenyl)-s-triazolo[4,3-a]quinoline.

PREPARATION 13

5-chloro-2′,6′-difluoro-2-(3-methyl-4H-1,2,4-triazol-4-yl)benzophenone

In the manner given in Preparation 6, 7-chloro-1-methyl-5-(2,6-difluorophenyl)-s-triazolo[4,3-a]quinoline was oxidized at low temperature with sodium periodate and ruthenium dioxide to give 5-chloro-2′,6′-difluoro-2-(3-methyl-4H-1,2,4-triazol-4-yl)benzophenone.

PREPARATION 14

6-chloro-4-(o-chlorophenyl)-2-hydrazinoquinoline

In the manner given in Preparation 4, 2,6-dichloro-4-(o-chlorophenyl)-quinoline (prepared as in Preparations 1 to 3) was reacted at reflux with hydrazine hydrate to give 6-chloro-4-(o-chlorophenyl)-2-hydrazinoquinoline.

PREPARATION 15

7-chloro-1-methyl-5-(o-chlorophenyl)-s-triazolo[4,3-a]quinoline

In the manner given in Preparation 5, 6-chloro-4-(o-chlorophenyl)-2-hydrazinoquinoline and triethyl orthoacetate were refluxed in xylene to give 7-chloro-1-methyl-5-(o-chlorophenyl)-s-triazolo[4,3-a]quinoline.

PREPARATION 16

2′,5-Dichloro-2-(3-methyl-4H-1,2,4-triazol-4-yl)benzophenone

In the manner given in Preparation 6, 7-chloro-1-methyl-5-(o-chlorophenyl)-s-triazolo[4,3-a]quinoline was oxidized at low temperature with sodium periodate in the presence of ruthenium dioxide to give 2′, 5-dichloro-2-(3-methyl-4H-1,2,4-triazol-4-yl)benzophenone.

PREPARATION 17

4-[2-(o-chlorobenzoyl)-4-chlorophenyl]-5-methyl-4H-1,2,4-triazole-3-carboxaldehyde In the manner given in Preparation 7, 7-chloro-1-methyl-5-(o-chlorophenyl)-s-triazolo[4,3-a]quinoline was oxidized with ruthenium dioxide and sodium periodate in acetone solution to give 4-[2-(o-chlorobenzoyl)-4-chlorophenyl]-5-methyl-4H-1,2,4-triazole-3-carboxaldehyde.

PREPARATION 18

4-[2-(o-chlorobenzoyl)-4-chlorophenyl]-5-methyl-4H-1,2,4-triazole-3-carboxaldehyde 3-oxime In the manner given in Preparation 10, 4-[2-(o-chlorobenzoyl)-4-chlorophenyl]-5-methyl-4H-1,2,4-triazolo-3-carboxaldehyde was heated with hydroxylamine hydrochloride and sodium acetate in 80% aqueous ethanol (V/V) to give 4-[2-(o-chlorobenzoyl-4-chlorophenyl]-5-methyl-4H-1,2,4-triazole-3-carboxaldehyde 3-oxime.

PREPARATION 19

4-[2-(2,6-difluorobenzoyl)-4-chlorophenyl]-5-methyl-4H-1,2,4-triazole-3-carboxaldehyde In the manner given in Preparation 7, 7-chloro-1-methyl-5-(2,6-difluorophenyl)-s-triazolo[4,3-a]quinoline was oxidized with ruthenium dioxide and sodium periodate in acetone solution to give 4-[2-(2,6-difluorobenzoyl)-4-chlorophenyl]-5-methyl-4H-1,2,4-triazolo-3-carboxaldehyde.

PREPARATION 20

4-[2-(2,6-difluorobenzoyl)-4-chlorophenyl]-5-methyl-4H-1,2,4-triazole-3-carboxaldehyde 3-oxime.

In the manner given in Preparation 10, 4-[2-(2,6-difluorobenzoyl)-4-chlorophenyl]-5-methyl-4H-1,2,4-triazole-3-carboxaldehyde was heated with hydroxylamine hydrochloride and sodium acetate in 80% aqueous ethanol (V/V) to give 4-[2-(2,6-difluorobenzoyl-4-chlorophenyl]-5-methyl-4H-1,2,4-triazole-3-carboxaldehyde 3-oxime.

PREPARATION 21

5-chloro-2-[3-(hydroxymethyl)-5-methyl-4H-1,2,4-triazol-4-yl]benzophenone

A stirred mixture of 5-chloro-2-(3-methyl-4H-1,2,4-triazolo-4-yl)benzophenone, (2.98 g., 0.01 mole) paraformaldehyde (3 g.) and xylene (100 ml.) was warmed under nitrogen, in a bath maintained at 125° C. for 7 hours. The mixture was then concentrated in vacuo. The residue was chromatographed on silica gel (150 g.) with 3% methanol-97% chloroform. Fifty-ml. fractions were collected. The product was eluted in fractions 20-44. The fractions were concentrated and the residue was crystallized from ethanol-ethyl acetate to give: 1.64 g. of melting point 138°-142° C.; 0.316 g. of melting point 138.5°-141° C.; 0.431 g. of melting point 139°-141° C. (72.8% yield) of 5-chloro-2-[3-(hydroxymethyl)-5-methyl-4H-1,2,4-triazol-4-yl]benzophenone. The analytical sample had a melting point of 138°-139° C.

Anal. calcd. for $C_{17}H_{14}ClN_3O_2$: C, 62.30; H, 4.30; Cl, 10.81; N, 12.82. Found: C, 62.23; H, 4.22; Cl, 10.82; N, 11.73.

PREPARATION 22

5-chloro-2-[3-(bromomethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in dry, hydrocarbon-stabilized chloroform (5 ml.) was cooled in an ice bath and treated with phosphorus tribromide (0.1 ml.). The colorless solution was kept in the ice bath for 55 minutes, at ambient temperature (22°-24° C.) for 5 hours. The resulting yellow solution was poured into a mixture of ice and dilute sodium bicarbonate. This mixture was extracted with chloroform. The extract was washed with brine, dried over anhydrous magnesium sulfate and concentrated. The residue was crystallized from methylene chloride-ethyl acetate to give: 0.285 g. of melting point 200°-240° (decomposition) and 0.030 g. of melting point 200°-220° (decomposition) of 5-chloro-2-[3-(bromomethyl)-5-methyl-4H-1,2,4-triazol-4-yl]benzophenone. The analytical sample had a melting point of 200°-240° C.

Anal. calcd. for $C_{17}H_{13}Br ClN_3O$: C, 52.26; H, 3.35; Br, 20.46; Cl, 9.08; N, 10.76 Found: C, 52.13, 52.45; H, 3.77, 3.66; Br, 20.44; Cl, 9.20; N, 10.43

PREPARATION 23

5-chloro-2-[3-(dimethylamino)methyl)-5-methyl-4H-1,2,4-triazol-4-yl]benzophenone A stirred suspension of 5-chloro-2-[3-(bromomethyl)-5-methyl-4H-1,2,4-triazol-4-yl]benzophenone in tetrahydrofuran was cooled in an ice-bath and treated with dimethyl amine in methanol. The resulting solution was allowed to warm to ambient temperature and stand for 24 hours. It was then concentrated in vacuo. The residue was suspended in water, treated with a little sodium bicarbonate, and extracted with methylene chloride. The extract was washed with brine, dried with anhydrous potassium carbonate, and concentrated. The residue was crystallized from methylene chloride-ethyl acetate to give 5-chloro-2-[3-(dimethylamino)methyl)-5-methyl-4H-1,2,4-triazol-4-yl]benzophenone of melting point 171°-172° C.

In the manner given in Preparation 21, but using other substituted amines in place of dimethylamine, e.g. lower monoalkylamines, such as methylamine, ethylamine, propylamine, isopropylamine, butylamine; other lower dialkylamines, such as diethylamines, dipropylamine, diisopropylamine, mixed amines such as methyl ethylamine, ethylpropylamine heterocyclic amines, e.g. pyrrolidine, piperidine, morpholine, piperazine or alkyl-substituted heterocyclic compounds, e.g. 4-methylpiperazine and the like other 2-[3-(substituted aminomethyl)-5-substituted-4H-1,2,4-triazol-4-yl]benzophenones of the formula:

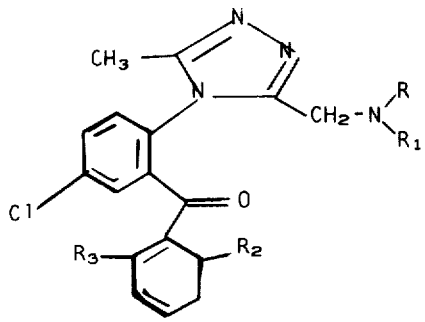

wherein R, $R_1$, $R_2$, and $R_3$ have the significance of hereinabove, are produced.

PREPARATION 24

5-chloro-2-[3-[(methylamino)methyl]-5-methyl-4H-1,2,4-triazol-4-yl]benzophenone

Prepared in a nitrogen atmosphere form 2-[3-(bromomethyl)-5-methyl-4H-1,2,4-triazol-4-yl]benzophenone in methanol and tetrahydrofuran and monomethylamine, had a melting point of 174°-175° C.

5-chloro-2-[3-[pyrrolidinomethyl)]-5-methyl-4H-1,2,4-triazol-4-yl]benzophenone was made in similar manner with pyrrolidine and had a melting point of 168° to 171° C.

5-chloro-2-[3[(diethylamino)methyl]-5-methyl-4H-1,2,4-triazol-4-yl]benzophenone had a melting point of 110.5°-111.5° C.

5-chloro-2-[3-(piperidino)methyl)-5-methyl-4H-1,2,4-triazol-4-yl]benzophenone was isolated as an oil. Its hydrochloride salt had a melting point of 226°-242° (decomp).

PREPARATION 25

5-chloro-2-[5-methyl-3-(morpholinomethyl)-4H-1,2,4-triazol-4-yl]benzophenone

A mixture of 3.0 ml. of 37% formalin (1.1 g., 37 mmol) 1.31 g. of morpholine (15.0 mmol) and 7.5 ml. of 2N HCl dissolved in 10 mg. of diglyme was placed in a 50 ml. flask with magnetic stirrer bar and reflux condenser. The solid 5-chloro-2-[3-methyl-4H-1,2,4-triazol-4-yl]-benzophenone (1.488 g., 4.00 mmol) was added in one portion, and the solution was refluxed for 24 hours. It was worked up by quenching in 5% aqueous sodium hydroxide (ph>9) and extracting with benzene. Attempts to crystallize the dried product failed and the material was chromatographed on Silica Gel (200 g.) using varying amounts of methanol in chloroform as eluent (i.e. 1 liter of chloroform, 1 liter of 1% methanol chloroform and 1 liter of 5% methanol chloroform). One hundred and fifty ml. fractions were collected. Fractions 20 and 21 contained the pure product. Fraction 22 contained primarily the product contaminated with an unknown material of lower Rf. Trituration of fractions 20 and 21 in ether separated the product from a gummy residue to give, after removal (under vacuum) of ether: 500 mg. of solid 5-chloro-2-[3-methyl-5-(morpholinomethyl)-4H-1,2,4-triazol-4-yl]-benzophenone of melting point 128–130° C. Recrystallization yielded 350 mg. of large prisms of melting point 128.5°–130.5° C.

Anal. calcd. for $C_{21}H_{21}ClN_4O_2$: C, 63.56; H, 5.34; N, 14.12; Cl, 8.93. Found: C, 63.41; H, 5.37; N, 14.21; Cl, 9.08.

PREPARATION 26

2′,5-dichloro-2-[3-(hydroxymethyl-5-methyl-4H-1,2,4-triazol-4-yl]benzophenone

In the manner given in Preparation 21, 2′,5-dichloro-2-(3-methyl-4H-1,2,4-triazole-4-yl)benzophenone was heated with paraformaldehyde in xylene to give 2′,5-dichloro-2-[3-(hydroxymethyl)-5-methyl-4H-1,2,4-triazol-4-yl]benzophenone.

PREPARATION 27

2′,5-dichloro-2-[3-(bromomethyl)-5-methyl-4H-1,2,4-triazol-4-yl]benzophenone

In the manner given in Preparation 22, 2′,5-dichloro-2-[3-(hydroxymethyl)-5-methyl-4H-1,2,4-triazol-4-yl]benzophenone in chloroform was treated with phosphorus tribromide to give 2′,5-dichloro-2-[3-(bromomethyl)-5-methyl-4H-1,2,4-triazol-4-yl]benzophenone.

PREPARATION 28

2′5′-dichloro-2-[3-[(dimethylamino)methyl]-5-methyl-4H-1,2,4-triazol-4-yl]benzophenone In the manner given in Preparation 23, 2′5′-dichloro-2-[3-(bromomethyl)-5-methyl-4H-1,2,4-triazol-4-yl]benzophenone in tetrahydrofuran was treated with dimethylamine to give 2′,5-dichloro-2-[3-[(dimethylamino)methyl]-5-methyl-4H-1,2,4-triazol-4-yl]benzophenone.

PREPARATION 29

2′6′-difluoro-2-[3-(hydroxymethyl-5-methyl-4H-1,2,4-triazol-4-yl]benzophenone

In the manner given in Preparation 21, 2′6′-difluoro-2-(3-methyl-4H-1,2,4-triazol-4-yl)benzophenone was heated with paraformaldehyde in xylene to give 2′,6′-difluoro-2-[3-(hydroxymethyl)-5-methyl-4H-1,2,4-triazol-4-yl]benzophenone.

PREPARATION 30

2′6′-difluoro-2-[3-(bromomethyl)-5-methyl-4H-1,2,4-triazol-4-yl]benzophenone

In the manner given in Preparation 22, 2′,6′-difluoro-2-[3-(hydroxymethyl)-5-methyl-4H-1,2,4-triazol-4-yl]benzophenone in chloroform was treated with phosphorus tribromide to give 2′,6′-difluoro-2-[3-(bromomethyl)-5-methyl-4H-1,2,4-triazol-4-yl]benzophenone.

PREPARATION 31

2′6′-difluoro-2-[3-[(dimethylamino)methyl]-5-methyl-4H-1,2,4-triazol-4-yl]benzophenone In the manner given in Preparation 23, 2′,6′-difluoro-2-[3-(bromomethyl)-5-methyl-4H-1,2,4-triazol-4-yl]benzophenone in tetrahydrofuran was treated with dimethylamine to give 2′,6′-difluoro-2-[3-[(dimethylamino)methyl]-5-methyl-4H-1,2,4-triazol-4-yl]benzophenone.

Other starting compounds can be prepared, as shown in the foregoing examples, such as:

5-chloro-2′-fluoro-2-[3-[(dimethylamino)methyl]-5-methyl-4H-1,2,4-triazol-4-yl]benzophenone;
2′5′-dichloro-2-[3-[(diethylamino)methyl]-5-methyl-4H-1,2,4-triazol-4-yl]benzophenone;
2′,5-dichloro-6′-fluoro-2-[3-[(dimethylamino) methyl]-5-methyl-4H-1,2,4-triazol-4-yl]benzophenone;
5-chloro-2′6′-difluoro-2-[3-[(diethylamino)methyl]-5-methyl-4H-1,2,4-triazol-4-yl]benzophenone;
5-chloro-2-[3-[(methylamino)methyl]-5-methyl-4H-1,2,4-triazol-4-yl]benzophenone;
2′,5′-dichloro-2-[3-[(methylamino)methyl]-5-methyl-4H-1,2,4-triazol-4-yl]benzophenone;
5-chloro-2′6′-difluoro-2-[3-[(ethylamino)methyl]-5-methyl-4H-1,2,4-triazol-4-yl]benzophenone;
5-chloro-2-[3-[(diethylamino)methyl]-5-methyl-4H-1,2,4-triazol-4-yl]benzophenone, and the like.

EXAMPLE 1

5-chloro-2-(3-methyl-4H-1,2,4-triazol-4-yl) benzhydrol and its hydrate 5-chloro-2-(3-methyl-4H-1,2,4-triazol-4-yl)benzophenone (0.298 g., 0.001 mole) was added to a stirred, ice-cold suspension of sodium borohydride (300 mg.) in ethanol (10 ml.) and the resulting mixture was stirred under nitrogen at ambient temperature for 18 hours and concentrated in vacuo. The residue was suspended in water and extracted with chloroform. The extract was washed with brine, dried over anhydrous magnesium sulfate, and concentrated. Crystallization of this residue from ethanolethyl acetate gave: 0.272 g. of 5-chloro-2-(3-methyl-4H-1,2,4-triazol-4-yl)benzhydrol hydrate of melting point 159.5°–169° C. Anal. calcd. for $C_{16}H_{14}ClN_3O.1/2H_2O$: C, 62.24; H, 4.90; Cl, 11.48. Found: C, 62.14; H, 4.78; Cl, 11.70; $H_2O$, 1.84.

The pure anhydrous benzhydrol was obtained by heating the hydrate to 105° in vacuo for 72 hours.

EXAMPLE 2

5-chloro-2-[5-methyl-3-(pyrrolidinomethyl)-4H-1,2,4-triazol-4-yl]benzhydrol, isomers A and B To a 10 ml. flask with a magnetic stirrer bar was added 0.3805 g. (2.00 mmol) of 5-chloro-2-[5-methyl-3-(pyrrolidinomethyl)-4H-1,2,4-triazol-4-yl]benzophenone, and 1.0 ml. of absolute ethanol. The mixture was cooled to 0° in an ice bath. Solid sodium borohydride (0.375 g., 1.00 mmol) was added in one portion and the mixture was stirred for 5 minutes at 0° C. The ice bath was removed and the stirring was continued. Within an additional 10 minutes all undissolved material disappeared. The mixture was stirred overnight. The reaction was worked up by cautiously adding hydrochloric acid to the mixture until gas evolution ceased. The mixture was then treated with 5% sodium hydroxide (the pH of the solution was made >9) and extracted with chloroform. Removal of chloroform left a diglyme solution. To the hot solution was added ether and hexane. Crystallization yielded 150 mg. of a white solid. Recrystallization (twice) afforded 50 mg. of white needles of 5-chloro-2-[5-methyl-3-(pyrrolidinomethyl)-4H-1,2,4-triazol-4-yl]benzhydrol isomer A of melting point 204°–205° C. [TLC (silica gel, 10% methanol/chloroform) revealed that this solid corresponded to the slower moving epimer of $R_f$ 0.26.]

Anal. calcd. for $C_{21}H_{23}ClN_4O$: C, 65.87; H, 6.06; N, 14.64; Cl, 9.26 Found: C, 65.78; H, 6.09; N, 14.66; Cl, 9.46.

The mother liquors from the crystallizations were recombined and dissolved in 3 ml. of diglyme. To be certain that all boron salts had been decomposed, the solution of mother liquors was refluxed for 3 hours with 3.0 ml. of methanol and 0.5 ml. of propionic acid. It was quenched in aq. 5% sodium hydroxide and worked up as described above. The material was chromatographed over 20 g. of Silica Gel G using 60 ml. of chloroform (fractions A, B, C), 120 ml. of 1% methanol-99% chloroform (fractions D, E, F, G, and H) and 200 ml. of 5% methanol-95% chloroform. Fractions A to J contained no products. Fractions K and L contained the fast moving epimer of $R_f$ 0.45. Fraction M contained a small amount of a mixture of the two epimers, whereas Fractions N, O, P, Q, and R contained only the epimer of $R_f$ 0.26. These last fractions were combined and crystallized from ethyl acetate/hexane to give 30 mg. of white needles of melting point 204°–206° C. Fractions K and L were triturated with ether to yield a white solid which was recrystallized from ethyl acetate/hexane to yield 70 mg. of prisms (isomer B) of melting point 183°–185° C. $R_f$ 0.45.

Anal. calcd. for $C_{21}H_{23}ClN_4O$ C, 65.87; H, 6.06; N, 14.64. Found: C, 65.47; H, 6.07; N, 14.36.

EXAMPLE 3

5-chloro-2-[5-methyl-3-(morpholinomethyl)-4H-1,2,4-triazol-4-yl]benzhydrol (A and B)

In the manner given in Example 2, 5-chloro-2-[5-methyl-3-(morpholinomethyl)-4H-1,2,4-triazol-4-yl]benzophenone in an ethanol-diglyme suspension was treated with potassium borohydride to give both A and B 5-chloro-2-[5-methyl-3-(morpholinomethyl)-4H-1,2,4-triazol-4-yl]benzhydrol which could be separated by column chromatography and fractional crystallization with ether-hexane into the two diastereomers A and B.

EXAMPLE 4

5-chloro-2-[5-methyl-3-(dimethylamino)methyl)-4H-1,2,4-triazol-4-yl]benzhydrol (A and B)

In the manner given in Example 2, 5-chloro-2-[5-methyl-3-((dimethylamino)methyl)-4H-1,2,4-triazol-4-yl]benzophenone in an ethanol-diglyme suspension was treated with sodium borohydride to give both A and B 5-chloro-2-[5-methyl-3-((dimethylamino)methyl)-4H-1,2,4-triazol-4-yl]benzhydrol which could be separated by column chromatography and fraction crystallization with ether-hexane into the two diastereomers A and B.

EXAMPLE 5

2',5-dichloro-2-[5-methyl-3-(piperidinomethyl)-4H-1,2,4-triazol-4-yl]benzhydrol (A and B)

In the manner given in Example 2, 2',5-dichloro-2-[5-methyl-3-(piperidinomethyl)-4H-1,2,4-triazol-4-yl]benzophenone in an ethanol-diglyme suspension was treated with sodium borohydride to give both A and B 2',5-dichloro-2-[5-methyl-3-(piperidinomethyl)-4H-1,2,4-triazol-4-yl]benzhydrol which could be separated by column chromatography and fractional crystallization with ether-hexane into the two diastereomers A and B.

EXAMPLE 6

2',5-dichloro-2-[5-methyl-3-(pyrrolidinomethyl)-4H-1,2,4-triazol-4-yl]benzhydrol (A and B)

In the manner given in Example 2, 2',5-dichloro-2-[5-methyl-3-(pyrrolidinomethyl)-4H-1,2,4-triazol-4-yl]-benzophenone in an ethanol-diglyme suspension was treated with potassium borohydride to give both A and B 2',5-dichloro-2-[5-methyl-3-(pyrrolidinomethyl)-4H-1,2,4-triazol-4-yl]benzhydrol which could be separated by column chromatography and fractional crystallization with ether-hexane into the two diastereomers A and B.

EXAMPLE 7

2',6'-Difluoro-5-chloro-2-[5-methyl-3-(morpholinomethyl)-4H-1,2,4-triazol-4-yl]benzhydrol (A and B)

In the manner given in Example 2, 2',6'-difluoro-5-chloro-2-[5-methyl-3-(morpholinomethyl)-4H-1,2,4-triazol-4-yl]benzophenone in an ethanol-diglyme suspension was treated with sodium borohydride to give both A and B 2',6'-difluoro-5-chloro-2-[5-methyl-3-(morpholinomethyl)-4H-1,2,4-triazol-4-yl]benzhydrol which could be separated by column chromatography and fraction crystallization with ether-hexane into the two diastereomers A and B.

EXAMPLE 8

2',5-[dichloro-2-[5-methyl-3-dimethylamino) methyl]-4H-1,2,4-triazol-4-yl]benzhydrol (A and B).

In the manner given in Example 2, 2',5-dichloro 2-[5-methyl-3-[(dimethylamino)methyl]-4H-1,2,4-triazol-4-yl]benzophenone in an ethanol-diglyme suspension was treated with potassium borohydride to give both A and B 2'5-dichloro-2-[5-methyl-[(dipropylamino)methyl]-3-4H-1,2,4]-benzhydrol which could be separated by column chromatography and fractional crystallization with etherhexane into the two diastereomers A and B.

EXAMPLE 9

5-chloro-2-[3((diethylamino)methyl)-5-methyl-4H-1,2,4-triazol-4-yl]benzhydrol (A and B)

In the manner given in Example 2, 5-chloro-2-[3-((diethylamino)methyl)-5-methyl-4H-1,2,4-triazol-4-yl]benzophenone in an ethanol-diglyme suspension was treated with sodium borohydride to give both A and B 5-chloro-2-[3-((diethylamino)methyl)-5-methyl-4H-1,2,4-triazol-4-yl]benzhydrol which could be separated by column chromatography and fractional crystallization with ether-hexane into the two diastereomers A and B.

EXAMPLE 10

2',5-Dichloro-2-[5-methyl-3-(morpholinomethyl)-4H-1,2,4-triazol-4-yl]benzhydrol (A and B)

In the manner given in Example 2, 2',5-dichloro-2-[5-methyl-3-(morpholinomethyl)-4H-1,2,4-triazol-4-yl]benzophenone in an ethanol-diglyme suspension was treated with potassium borohydride to give both A and B 2',5-dichloro-2-[5-methyl-3-(morpholinomethyl)-4H-1,2,4-triazol-4-yl]benzhydrol which could be separated by column chromatography and fractional crystallization with etherhexane into the two diastereomers A and B.

EXAMPLE 11

2',6'-difluoro-5-chloro-2-[5-methyl-3-(pyrolidinomethyl)-4H-1,2,4-triazol-4-yl]benzhydrol (A and B)

In the manner given in Example 2, 2',6'-difluoro-5-chloro-2-[5-methyl-3-(pyrrolidinomethyl)-4H-1,2,4-triazol-4-yl]benzophenone in an ethanol-diglyme suspension was treated with potassium borohydride to give both A and B 2',6'-difluoro-5-chloro-2-[5-methyl-3-(pyrrolidinomethyl)-4H-1,2,4-triazol-4-yl]benzhydrol which could be separated by column chromatography and fractional crystallization with ether-hexane into the two diastereomers A and B.

EXAMPLE 12

5-chloro-2',6'-difluoro-2-[3-(piperidinomethyl)-5-methyl-4H-1,2,4-triazol-4-yl]benzhydrol (A and B)

In the manner given in Example 2, 5-chloro-2',6'-difluoro-2-[3-(piperidinomethyl)-5-methyl-4H-1,2,4-triazol-4-yl]benzophenone in an ethanol-diglyme suspension was treated with potassium borohydride to give both A and B 5-chloro-2'6'-difluoro-2-[3-(piperidinomethyl)-5-methyl-4H-1,2,4-triazol-4-yl]benzhydrol which could be separated by column chromatography and fractional crystallization with ether-hexane into the two diastereomers A and B.

EXAMPLE 13

5-chloro-2'6'-difluoro-2-[5-methyl-3-[(dimethylamino)-methyl]-4H-1,2,4-triazol-4-yl]benzhydrol (A and B).

In the manner given in Example 2, 5-chloro-2'6'-difluoro-2-[5-methyl-3-[(dimethylamino)methyl]-4H-1,2,4-triazol-4-yl]benzophenone in an ethanol-diglyme suspension was treated with sodium borohydride to give both A and B 5-chloro-2',6'-difluoro-2-[5-methyl-3-[(dimethylamino)-methyl]-4H-1,24-triazol-4-yl]benzhydrol which could be separated by column chromatography and fractional crystallization with ether-hexane into the two diastereomers A and B.

EXAMPLE 14

4-[2-Benzoyl-4-chlorophenyl]-5-methyl-4H-1,2,4-triazole-3-carboxaldehyde 3-(O-acetyloxime)

4-(2-Benzoyl-4-chlorophenyl)-5-methyl-4H-1,2,4-triazole-3-carboxaldehyde 3-oxime (2.10 g.) was added to an ice cold solution of acetic anhydride (6 ml.) in pyridine (30 ml.) and the resulting mixture was stirred at ambient temperature, under nitrogen for 18 hours and then poured into ice water. The solid was collected by filtration, washed with water, dried and crystallized from chloroform-ethanol to give 2.05 g. of 4-(2-benzoyl-4-chlorophenyl)-5-methyl-4H-1,2,4-triazole-3-carboxaldehyde 3-(O-acetyloxime) of melting point 171°–173° C. The analytical sample had a melting point of 170°–171° C.

Anal. calcd. for $C_{19}H_{16}ClN_4O_3$: C, 59.45; H, 4.20; Cl, 9.24; N, 14.60. Found: C, 59.23; H, 3.92; Cl, 9.47; N, 14.60.

In the manner given in Example 14 the acetates and propionates of other 4-(2-benzoylphenyl)-5-substituted 4H-1,2,4-triazole-3-carboxaldehyde 3-oximes can be obtained by reacting a free oxime of formula III with acetic or propionic aldehyde. Representative compounds thus obtained include:

4-[2-(o-chlorobenzyl)-4-chlorophenyl]-5-methyl-4H-1,2,4-triazole-3-carboxaldehyde 3-O-acetyloxime;

4-[2-(2,6-difluorobenzoyl)-4-chlorophenyl]-5-methyl-4H-1,2,4-triazole-3-carboxaldehyde 3-O-propionyloxime and the like.

EXAMPLE 15

5-Chloro-2-[3-(aminomethyl)-5-methyl-4H-1,2,4-triazol-4-yl]benzhydrol

A 1M solution of borane in tetrahydrofuran (68 ml.) was added to a stirred, ice cold solution of 4-(2-benzoyl-4-chlorophenyl)-5-methyl-4H-1,2,4-triazole-3-carboxaldehyde-3-(O-acetyloxime) (4.34 g., 0.0113 mole) in 170 ml. and the resulting solution was stirred, in the ice bath, under nitrogen, for 2 hours and for 18 hours at ambient temperature. This solution was cooled in an ice bath, treated with 6N hydrochloric acid (10.2 ml.) and concentrated in vacuo. A solution of the residue in methanol was again concentrated in vacuo. The reside was suspended in a mixture of water and ether and stirred for about 1 hour. The liquid was decanted from a gum, and the ether layer was extracted with dilute hydrochloric acid and water. The aqueous layer was combined with the aqueous extracts and gum, made alkaline with sodium hydroxide, and extracted with chloroform. The extract was washed with brine, dried over anhydrous potassium carbonate and concentrated. The residue was crystallized from methanol-ethyl acetate to give: 0.72 g. of 5-chloro-2-[3-(aminomethyl)-5-methyl-4H-1,2,4-triazole-4-yl]benzhydrol as a mixture of diastereomers of melting point of 209°–212° C, and 0.77 g. of melting point 200°–206° C. The analytical sample had a melting point of 218°–219° C.

Anal. calcd. for $C_{17}H_{17}ClN_4O$: C, 62.10; H, 5.21; Cl, 10.78; N, 17.04. Found: C, 61.86; H, 5.15; Cl, 10.80; N, 16.99.

EXAMPLE 16

2',5-dichloro-2-[3-(aminomethyl)-5-methyl-4H-1,2,4-triazol-4-yl]benzhydrol

In the manner given in Example 15, a solution of borane in tetrahydrofuran was added to a cold solution of 4-[2-(o-chlorobenzoyl)-4-chlorophenyl]-5-methyl-4H-1,2,4-triazole-3-carboxaldehyde-3-0-acetyloxime to give 2',5-dichloro-2-[3-(aminomethyl)-5-methyl-4H-1,2,4-triazol-4-yl]benzhydrol.

EXAMPLE 17

5-Chloro-2',6'-difluoro-2-[3-(aminomethyl)-5-methyl-4H-1,2,4-triazol-4-yl]benzhydrol In the manner given to Example 15, a solution of borane in tetrahydrofuran was added to a cold solution of 4-[2-(2,6-difluorobenzoyl)-4-chlorophenyl)]-5-methyl-4H-1,2,4-triazole-3-carboxaldehyde 3-(0-propionyloxime) to give 5-chloro-2',6'-difluoro-2-[3-(aminomethyl)-5-methyl-4H-1,2,4-triazol-4-yl]benzhydrol.

EXAMPLE 18

5-chloro-2'-fluoro-2-[3-(aminomethyl)-5-methyl-4H-1,2,4-triazol-4-yl]benzhydrol

In the manner given in Example 15, a solution of borane in tetrahydrofuran was added to a cold solution of 4-[2-(o-fluorobenzoyl)-5-chlorophenyl]-5-methyl-4H-1,2,4-triazole-3-carboxaldehyde 3-(0-acetyloxime) to give 5-chloro-2'-fluoro-2-[3-(aminomethyl)-5-methyl-4H-1,2,4-triazol-4-yl]benzhydrol.

Treatment of the compounds of formula VI with a pharmacologically acceptable acid such as hydrochloric, hydrobromic, phosphoric, sulfuric, acetic, propionic, toluenesulfonic, naphthalene-β-sulfonic, methane-sulfonic, tartaric, citric, lactic, malic, maleic, or cyclohexanesulfamic (acids) produces the pharmacologically acceptable salts of these compounds of formula VI. The salts can be used for the same purposes of the free base compounds of formula VI.

Salt formation is achieved in conventional manner by reacting the compounds of formula VI with an excess of a selected acid in a suitable medium e.g. water, alkanol, ether, or acetone, and recovering the salt by evaporating the solvent, preferably in vacuo.

We claim:

1. 5-Chloro-2-[5-methyl-3-[(dimethylamino)methyl-4H-1,2,4-triazol-4yl]benzhydrol.

2. 5-Chloro-2',6'-difluoro-[5-methyl-3-[dimethylamino)-methyl]-4H-1,2,4-triazol-4-yl]benzhydrol.

3. 2',5-Dichloro-2-[5-methyl-3-[(dimethylamino)methyl]-4H-1,2,4-triazol-4-yl]benzhydrol.

4. 2',5-Dichloro-2-[5-methyl-3-(aminomethyl)-4H-1,2,4-triazol-4-yl]benzhydrol.

* * * * *